Jan. 27, 1942.　　　S. MacD. PARKER　　　2,271,031
VALVE MECHANISM FOR LIQUID PRESSURE CONTROL SYSTEMS
Original Filed Jan. 22, 1938　　2 Sheets-Sheet 2
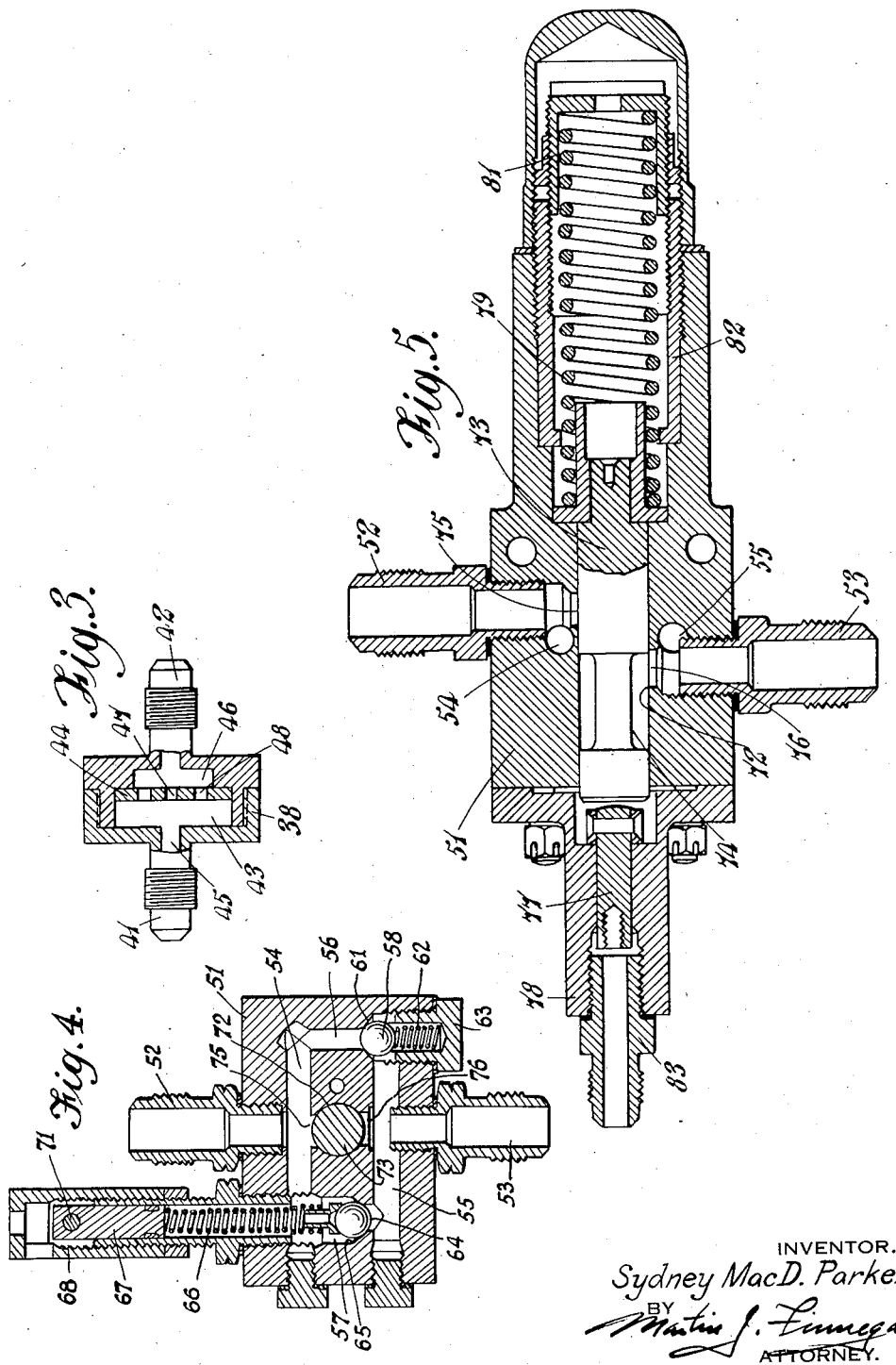
INVENTOR.
Sydney MacD. Parker
BY
Martin J. Finnegan
ATTORNEY.

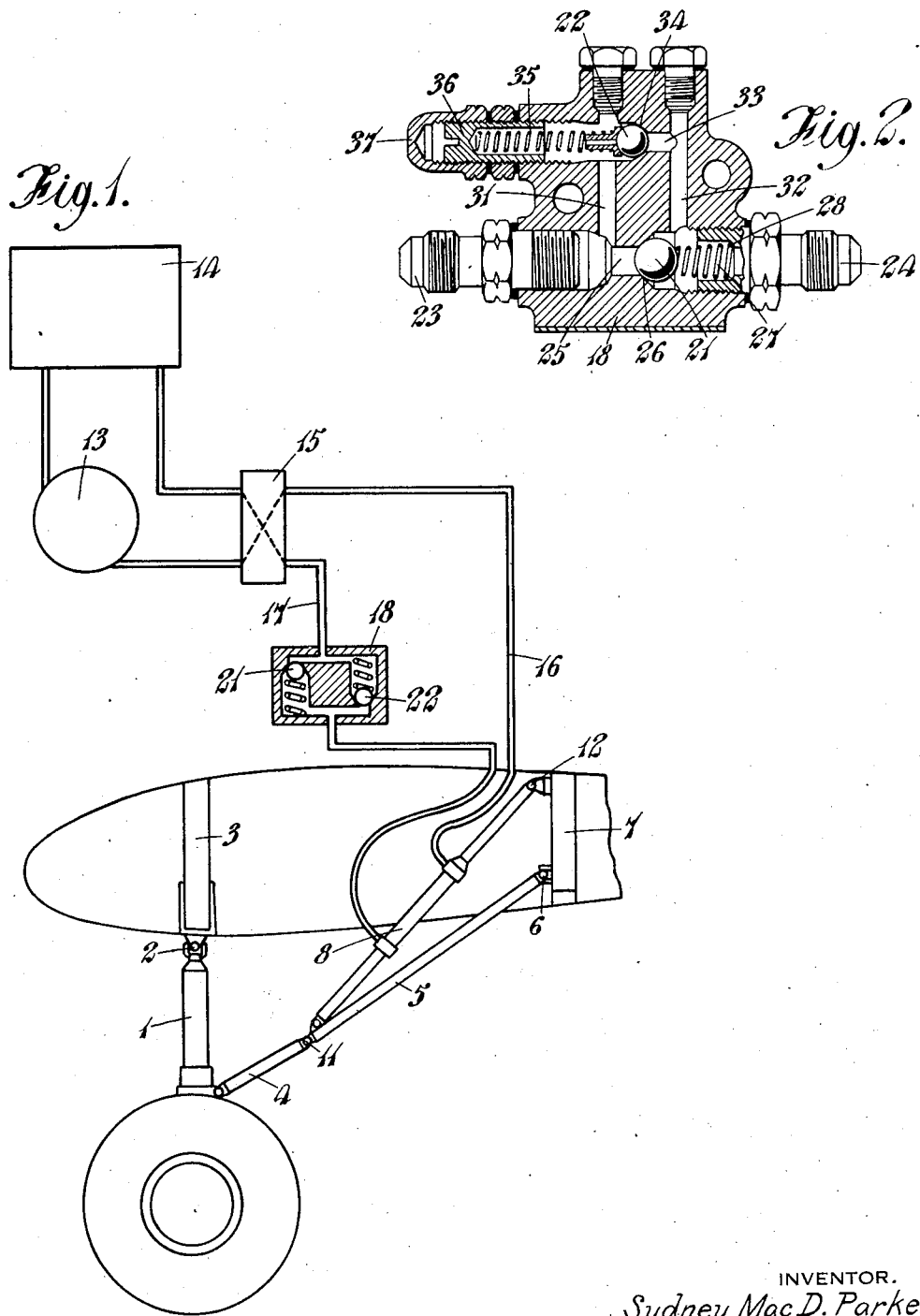

Patented Jan. 27, 1942

2,271,031

UNITED STATES PATENT OFFICE 2,271,031

VALVE MECHANISM FOR LIQUID PRESSURE CONTROL SYSTEMS

Sydney Macdonald Parker, Myton, Warwick, England, assignor to Automotive Products Company Limited, London, England Original application January 22, 1938, Serial No. 186,448, now Patent No. 2,244,894, dated June 10, 1941. Divided and this application January 4, 1939, Serial No. 249,290. In Great Britain January 30, 1937

5 Claims. (Cl. 137—153)

This invention relates to liquid pressure control systems adapted to be used for operation of aircraft retractable undercarriages, fairing doors, bomb release devices and the like, which are assisted in one direction of their movement by the action of gravity or other external forces.

The gravitational force on these devices may well be of such extent that, if they are allowed to fall freely the sudden arresting of their movement at the lowered position may cause a shock sufficiently great to produce undesirable stresses in the aircraft framework, thus necesitating a heavier and stronger framework than would otherwies be required. Further, during such a free falling movement, there is a tendency for a vacuum to form in the liquid pressure system, which may cause air to be drawn in, thus reducing the efficiency of the system.

One object of the present invention is to provide a liquid pressure control system in which the free fall of the operated member under the action of gravity or other external forces is controlled or restricted.

Another object of the invention is to provide for use in a liquid pressure control system comprising a pump having a connection with a motor, valve means offering a greater resistance to the flow of liquid in one direction than to the flow of liquid in the other direction.

Another object of the invention is to provide for use in a liquid pressure control system including a pump and a double-acting motor, characterized by unrestricted flow of liquid from the pump to the motor for operating said motor in one direction, valve means for restricting the flow of liquid from said motor when the latter is operated in an opposite direction.

Yet another object of the invention is to provide for use in a liquid pressure control system including a pump having a connection with a motor, a valve on said connection for restricting the flow of liquid from said motor in one direction, and means for by-passing said valve in the event of the resistance offered to said flow of liquid exceeding a predetermined value.

Other object and features of the invention and other novel combinations of parts and desirable particular constructions will be apparent from the following description and from the accompanying drawings, in which—

Figure 1 is a diagrammatic view of a liquid pressure control system in accordance with my invention, shown in association with an aircraft retractable undercarriage;

Figure 2 is a section on an enlarged scale of the valve means shown diagrammatically on Figure 1;

Figure 3 shows an alternative embodiment of the valve means;

Figure 4 shows a further embodiment of valve means, in which is incorporated a pressure operated valve member which permits the by-passing of the heavily loaded valve, and Figure 5 is a section at right-angles to that shown in Figure 4.

Referring to the drawings, Figure 1 shows, diagrammatically, an aircraft undercarriage comprising a shock absorber leg 1 pivoted at 2 to the front wing spar 3 of an aircraft, and a folding strut consisting of two portions 4 and 5 extending between the leg 1 and an attachment point 6 on the rear wing spar 7. A liquid pressure operated jack 8 is mounted between the upper part 5 of the strut near the joint 11 of the two parts, and a second attachment point 12 on the rear wing spar 7.

The jack 8 is of the double acting type, and is operated by liquid pressure generated by a pump 13 driven by the engine of the aircraft. The pump 13 draws liquid from a reservoir 14, and delivers it to a selector valve 15, which may be set to connect the pump delivery to either of two conduits 16 and 17, the former of which leads to the upper end of the jack 8, and so conveys liquid thereto for the purpose of lowering the undercarriage, whilst the latter, 17, conveys liquid to the lower end of the jack to raise the undercarriage. It is of course obvious that the conduit which, during any particular operation is not delivering liquid to the jack, is being traversed by liquid returning from the low-pressure side of the jack to the reservoir.

On the conduit 17 is mounted a valve means 18, consisting of two non-return valves 21, 22 opening in opposite directions.

The inlet valve 21 opens when liquid travels from the pump 13 to the jack 8 to raise the undercarriage, the outlet valve 22 being then held firmly on its seat by the pressure. The valve 21 has only a light spring tending to hold it on its seat, and there is therefore practically no restriction to the flow of liquid entering the jack to shorten it and produce retraction of the undercarriage.

The inlet valve 21 is of course held on to its seat when liquid is returning from the jack to the reservoir by the conduit 17, and the outlet valve 22 has to open to allow such liquid to pass. This outlet valve 22 is loaded by a strong spring, so that a considerable pressure must be created in the liquid before this valve opens.

In retractable undercarriages, movement from the retracted to the extended position is of course assisted by the action of gravity, and the valve means according to my invention controls the movement of the undercarriage when it is being so assisted, to prevent the undercarriage from "running away" from the operating pressure. The loading of the outlet valve may of course be so arranged that the weight of the undercarriage is just sufficient to overcome the resistance, and the undercarriage falls slowly under its own weight, or this valve may be so loaded as entirely to prevent downward movement of the undercarriage under its own weight, it being necessary to create pressure in the upper end of the jack for the lowering operation.

Figure 2 is a detailed view of valve means 18 shown in Figure 1. The valve means is inserted in the conduit 17, the two sections of which are connected to the unions 23 and 24. The latter are connected internally by a direct passage 25 in which is mounted the lightly loaded ball valve 21, co-operating with a seat 26. This valve is loaded on to the seat 26 by a light spring 27 taking its support at 28 on the inner part of the union 24. On each side of the valve 21 are connected transverse passages 31, 32, connected by a further bore 33 parallel to the direct passage 25. In the bore 33 is a valve seat 34 on which seats the outlet ball valve 22, loaded by a spring 35 the strength of which is selected to give the necessary resistance to lowering of the undercarriage. This spring is adjustable by means of an abutment screw 36 locked in position by a cap nut 37, to vary the loading of the valve.

An alternative form of valve means is shown in Figure 3, consisting of a casing 38 having unions 41, 42 for connecting it to the conduit 17 (Figure 1), and having a chamber 43 in which is movably mounted a plate 44.

The two unions 41, 42 are connected to ports 45 and 46 in the opposite end walls of the chamber 43, the port 46 connected to the union 42 on the side of the valve nearer to the jack being of greater area than the port 45. The plate 44 has a central aperture 47 which registers with the port 45, but is of less area than this port, and a series of supplementary apertures 48 arranged around a circle and which come within the area of the port 46 but are outside the area of the port 45. The flow of liquid in the conduit causes the plate 44 to bear against the wall of the chamber 43 opposite to that through which the liquid is entering. Consequently, when liquid is being supplied to the jack to raise the undercarriage, the plate 44 is held against the wall of the chamber 43 containing the port 46, and liquid can flow through all the apertures 47 and 48, giving a free flow. Liquid returning from the jack to the reservoir when the undercarriage is being lowered moves the plate 44 into engagement with the other wall of the chamber 43, thus shutting off the apertures 48, and leaving only the aperture 47 open, and causing a restriction of flow which depends on the area of the aperture 47.

The valve means shown in Figures 4 and 5 is similar to that shown in Figure 2, but has incorporated therein a by-pass which is opened when a predetermined pressure is reached in the system, to by-pass the heavily loaded outlet valve, and allow the full pressure generated by the pump to be usefully employed in the movement of the undercarriage. This by-pass is an extremely desirable feature in cases where the whole extending movement of the undercarriage is not assisted by gravity, or where, in the later stages of lowering, the effect of gravity on the undercarriage is counterbalanced, or more than counterbalanced by the resistance of the airstream, or where a lock has to be engaged or disengaged at the end or beginning of the undercarriage movement.

This device comprises a casing 51 in which are mounted unions 52, 53 for connection to the two parts of the conduit 17 (Figure 1). These unions open into parallel passages 54, 55 in the casing 51, which passages are connected near their ends by cross passages 56, 57. The passage 56 contains the lightly loaded inlet valve 58, which is urged towards a seat 61 by a spring 62 taking its abutment on a plug 63. The passage 57 contains the heavily loaded outlet valve 64, urged towards its seat 65 by a spring 66 whose compression is adjustable by means of a plunger 67 and screw-threaded sleeve 68, the plunger being positioned relatively to the sleeve 68 by a pin 71 extending through registering holes formed in said sleeve.

The pin 71 provides a releasing device for the outlet valve, removal of the pin taking off the load from the spring 66 and so freeing the valve 64. The primary object of this is to enable the entire removal of the resistance offered to the flow of liquid in the event of failure of the engine driven pump, which normally generates the pressure in the system, so that operation by an auxiliary hand pump may be facilitated.

In the casing 51 formed with passages 54, 55 and passages 56, 57, is formed a bore 72 having its axis at right angles to the general plane of these passages, and a valve member 73, having an annular groove 74, is slidably mounted in said bore. Ports 75, 76 connect the passages 54, 55 to the bore 72 at spaced points along its length, and these ports are disconnected or connected by movement of the valve member 73 in the bore, said ports being connected when both of them are in register with the annular groove 74. To one end of the valve member 73 is connected a piston 77 fitting in a cylinder 78 formed by a reduced extension of the bore 72, and the other end of said valve member is loaded by a spring 79, adapted to be adjusted by means of a thimble 81 threaded into a sleeve 82 itself mounted in the end of the casing 51.

The operation of this device is similar to that of the valve means described with reference to Figures 1 and 2, the valve member 73 being normally in such a position that the port 75 is disconnected from the port 76. The cylinder 78 is connected by a union 83 and branch conduit to the conduit 16 of Figure 1, so that the pressure in that conduit during lowering of the undercarriage acts on the piston 77, tending to move the valve member 73 to the right of Figure 5. The spring 79 may be of any selected strength, so that the valve member 73 is moved when the load reaches a predetermined limit to by-pass the outlet valve 64 and permit the full pressure generated by the pump to act on the undercarriage jack.

So long as the undercarriage is extending easily, very little pressure exists in the conduit 16, and the outlet valve 64 remains in action to control such extension.

If however a resistance to extension is met, as for example when the undercarriage reaches a position in which gravity no longer assists its movement, the pressure rises until it acts on the piston 77 with sufficient force to compress the spring 79 and move the valve member 73 to bring the ports 75 and 76 into communication with each other, thus allowing liquid to flow from the jack to the reservoir without restriction, and permitting the full pump pressure to be usefully used to complete the extension of the undercarriage.

It will be understood that the higher pressure may be necessary at the commencement of the extension of the undercarriage, for example to release a lock. In this case the valve member 73 will be moved to connect the ports 75 and 76 before the undercarriage is released, and as soon as the undercarriage is released and its weight begins to assist the extension, the fall of pressure in the conduit 16 will allow the spring 79 to return the valve member 73 to a position in which the port 53 is disconnected from the port 52, and the outlet valve will come into action.

Although this invention has been described in connection with certain specific embodiments, the principles involved are susceptible of numerous other applications which will readily occur to persons skilled in the art. The invention is, therefore, to be limited only as indicated by the scope of the appended claims.

This application is a division of my co-pending application No. 186,448, filed January 22, 1938, now Patent No. 2,244,894, granted June 10, 1941.

What I claim is:

1. A valve means including one valve opening in one direction in response to the pressure of fluid directed thereto, and permitting flow therethrough, another valve opening in opposite direction in response to the pressure of fluid directed thereto, and permitting flow therethrough, a third valve adapted to by-pass said first and second valves, and means for opening said third valve, said opening means including an element which is subjected to the pressure of a body of fluid other than that which is directed to and flows through said third valve.

2. A valve means for connecting two ports including one valve permitting flow of fluid through said ports in one direction in response to the pressure of the fluid directed thereto, a second valve permitting flow of fluid through said ports in opposite direction in response to the pressure of the fluid directed thereto, and a third valve for directly connecting said ports in response to the pressure of confined fluid other than that fluid which is directed thereto.

3. In a valve housing having a conduit leading thereto from an external fluid source, and a second conduit extending therefrom to a point of fluid use, valve means including a non-return valve permitting flow from said first to said second conduit, a second non-return valve permitting flow back to said first conduit by way of said second conduit, a third valve shiftable to a position directly connecting said conduits, and means responsive to a pressure rise of predetermined amount, at said point of use, for shifting said third valve to said conduit connecting position.

4. In a valve housing having a conduit leading thereto from an external fluid source, and a second conduit extending therefrom to a point of fluid use, valve means including a non-return valve permitting flow from said first to said second conduit, a second non-return valve permitting flow back to said first conduit by way of said second conduit, a third valve shiftable to a position directly connecting said conduits, and means independent of the direction of flow in said conduits for shifting said third valve to said conduit connecting position.

5. A valve means including two valves, each shiftable, by fluid flow directed thereto, and in the direction of fluid flow, a third valve shiftable transversely of the direction of flow, to increase the rate of flow beyond the capacity of either of said first-named valves, and means for shifting said third valve, said shifting means being independent of the fluid which flows through said third valve.

SYDNEY MACDONALD PARKER.